United States Patent [19]

Kelleher et al.

[11] 4,375,094

[45] Feb. 22, 1983

[54] APPARATUS FOR ADVANCING A VIDEO DISC PICKUP TRANSDUCER BEYOND A DISC RECORD DEFECT

[75] Inventors: Kevin C. Kelleher, Plainfield; Todd J. Christopher, Indianapolis, both of Ind.

[73] Assignee: RCA Corporation, New York, N.Y.

[21] Appl. No.: 205,342

[22] Filed: Nov. 10, 1980

[51] Int. Cl.³ .............................................. H04N 5/76
[52] U.S. Cl. .................................... 369/43; 369/126; 358/338; 358/342
[58] Field of Search ................................ 358/127–132, 358/338, 342; 369/43–46, 126; 360/DIG. 1

[56] References Cited

U.S. PATENT DOCUMENTS

| | | | |
|---|---|---|---|
| 3,961,131 | 6/1976 | Taylor | 178/6.6 R |
| 3,963,861 | 6/1976 | Crooks | 178/6.6 R |
| 3,973,080 | 8/1976 | Dickopp et al. | 178/6.6 R |
| 4,142,209 | 2/1979 | Hedlund et al. | 358/128 |
| 4,152,727 | 5/1979 | Tatsuguchi et al. | 358/128 |
| 4,164,756 | 8/1979 | Toda et al. | 358/128 |
| 4,170,783 | 10/1979 | Tajima | 358/128 |
| 4,176,378 | 11/1979 | Toda et al. | 358/128 |
| 4,183,059 | 1/1980 | Palmer | 358/128 |
| 4,280,023 | 7/1981 | Christopher | 369/43 |
| 4,310,914 | 1/1982 | Riddle | 358/128.5 |
| 4,313,189 | 1/1982 | McGuffin | 358/128.5 |
| 4,320,487 | 3/1982 | Guarracini et al. | 369/43 |

OTHER PUBLICATIONS

U.S. Pat. Application Serial No. 116,249 filed 1/28/80, Christopher, "Video Disc Stylus Position Sensor System".

Primary Examiner—Raymond F. Cardillo, Jr.
Attorney, Agent, or Firm—E. M. Whitacre; J. S. Tripoli; E. P. Herrmann

[57] ABSTRACT

Video disc player apparatus for aiding the signal recovery stylus to overcome locked grooves insurmountable by normal stylus deflection transducers. The player comprises a signal pickup stylus secured to a first end of a stylus arm, the second end thereof being secured to a carriage mechanism. The carriage mechanism is driven by a servomechanism responsive to the relative stylus-carriage position so as to translate the second end of the stylus arm in consonance with the radial travel of the pickup stylus engaging the disc. Secured within the carriage is a stylus deflection transducer which cooperates with the stylus arm to selectively translate the pickup stylus past a preselected number of grooves when the stylus is prevented from normal progression by a defect occurring on the disc surface. Occasionally defects occur which cannot be bypassed by deflector induced stylus translations due to limitations in the deflector transducer. Upon detection of a failure of deflector induced stylus translations, an offset is applied within the carriage servomechanism tending to impart a mechanical bias between the carriage and stylus arm, which bias produces a force in the stylus arm in a direction to aid the forces applied by the deflection transducer.

9 Claims, 1 Drawing Figure

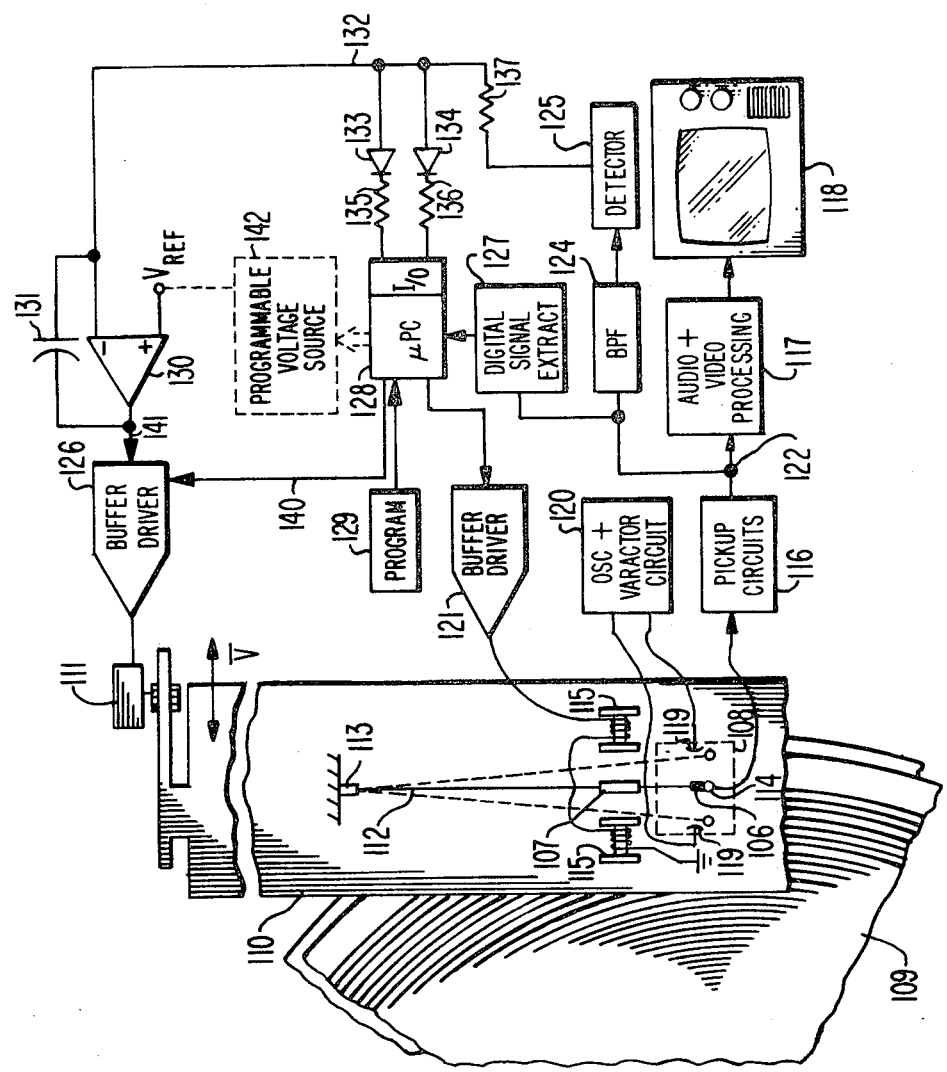

APPARATUS FOR ADVANCING A VIDEO DISC PICKUP TRANSDUCER BEYOND A DISC RECORD DEFECT

This invention relates to video disc player apparatus and more particularly to a system for advancing a signal pickup transducer past relatively large disc defects which defeat normal video disc signal pickup transducer tracking mechanisms.

Video disc systems typically incorporate disc records with information recorded in circular tracks or convolutions of a continuous spiral track. In order to incorporate an acceptably sufficient amount of recorded information on the disc, track density is made very high, i.e., six to ten thousand convolutions per inch and the elemental signal size along the track is in the order to ten microinches. In order to recover the recorded signal without introducing signal crosstalk, a concomitantly small signal pickup transducer is required. Typical capacitive video disc systems of the foregoing type employ a signal pickup stylus contoured to engage the information track, the stylus having a thin electrode thereon which forms a varying capacitance with the signal elements of the disc record. The stylus is secured to a cantilevered arm which in turn is mounted in a carriage mechanism for translating the stylus in a direction radially across the disc in the proper time relationship with signal recovery.

The cantilevered stylus arm is arranged in the carriage for relative movement therein so that the stylus can trace the information track independent of the carriage, and the carriage is servoed to maintain a nominal carriage-stylus relationship. Systems employing grooved records utilize a stylus which enters the groove and tracks the groove by virtue of lateral forces between the stylus tip and the groove walls. Systems employing grooveless capacitive type records utilize electromechanical transducers secured between the carriage and cantilever to steer the stylus over the information tracks.

The presence of defects in the surface of the disc records tend to undesirably disturb normal signal recovery by causing repeated play of one or more grooves (locked groove condition) or by prematurely advancing the stylus over one or more tracks (skipped grooves). The skipped groove occurrence is less disturbing than the locked groove condition and is typically ignored. The locked groove condition, on the other hand, may continue indefinitely, and therefore provision is made in the carriage apparatus to forceably advance the stylus past the defect. Typically, a groove skipper which cooperates with, or is integral to, the stylus arm produces a predetermined radial stylus translation to impulsively advance the stylus past the defect without damaging either the disc or the stylus. To assure that the size and mass of such skipper or deflection mechanisms do not affect the replay dynamics of the stylus/stylus arm system, these mechanisms are designed to produce only limited deflection forces. It has been found that such skipper mechanisms are unable to advance the stylus past certain of the larger disc defects. Further, it has been found to be undesirable to simply advance the carriage so as to engage the cantilevered stylus arm and plow past the defect as this tends to damage the pickup stylus. Still further, it is undesirable to raise the stylus and advance the carriage and thereby the stylus past the defect because of the sustained loss of picture on the display during the operation.

The present invention solves the foregoing problem in most instances with a minimum of signal disturbance during the corrective operation and without disc or stylus damage. In the present invention, upon detection of a continued locked groove condition even after normal corrective action has been taken, a quantum of bias signal is applied to the carriage servo system to offset the carriage position relative to the nominal stylus-carriage relationship, thereby tending to impart a mechanical bias to the stylus arm in the direction of desired stylus travel. The mechanical bias of the stylus arm is additive to the force imparted to the stylus arm by the skipper or deflection mechanism enabling a particular skipper to overcome larger defects. If the corrective action is still ineffective, a further quantum of bias signal is applied to the carriage servo to further mechanically bias the stylus arm. As a last resort the stylus is lifted or plowed past the defect.

The invention will be more particularly defined in the following detailed description in conjunction with the accompanying drawing.

In the drawing a carriage assembly 110 supports and translates a signal pickup stylus 114 radially across the disc record 109 in synchronism with the radial travel of the stylus engaging an information track. The pickup stylus 114 engages the disc record through aperture 108 in the carriage, and the carriage is translated by motor 111. The motor is energized by the driver 126 controlled by the microprocessor 128 via connection 140 and by loop servo signals via filter 130.

The pickup stylus 114 is mounted at the free end of a rigid cantilevered stylus arm 112. The second end of the stylus arm is secured by compliant coupler 113 to the carriage or to a stylus assembly cartridge (not shown) removably mounted in the carriage. The coupler 113 permits relatively free movement of the pickup stylus with respect to the carriage at least in the direction of movement designated V in the drawing and indicated by the stylus arm shown in phantom lines. The coupler, however, is sufficiently elastic to apply some restorative force to the stylus arm tending to reposition it toward its nominal or centered position.

The pickup stylus 114 cooperates with the disc record 109 and signal pickup circuitry 116 to recover the prerecorded information on the disc. Recovered signals available from the pickup circuitry at connection 122 are conditioned by the audio and video processing circuitry 117 for application to the antenna input terminals of a standard television receiver 118.

The apparatus includes a stylus position sensor comprising position sensitive capacitances formed between electrodes 119 secured to the carriage and electrode 106 secured to the stylus arm and which is electrically connected to the pickup stylus. The electrodes 119 are serially connected with varactor diodes in circuitry 120 and energized with a 260 KHz oscillatory signal. The respective serially connected position sensitive capacitance and varactor diode pairs are electrically in parallel connection with the stylus-disc signal capacitance such that variations in the respective position sensitive capacitance, i.e., distance between electrode 106 and particular electrode 119 is manifested as a 260 KHz electric signal occurring at the output connection 122 of the pickup circuitry. The 260 KHz signal is extracted from the recovered information signal by a 260 KHz bandpass filter 124 and applied to detector 125 which generates a control signal related to the phase and amplitude of the recovered signal. The detector 125 may be a Quadrature Detector such as the RCA Corp. CA2111 integrated circuit connected to operate in the synchronous detection mode. The servo system is described with more particularity in filed U.S. Pat. No. 4,327,434 Jan. 28, 1980 and entitled "Video Disc Stylus Position Sensor System." Output signal from detector 125 is applied via resistor 137 to the amplifier 130 arranged as an integrator by virtue of the feedback capacitor 131 between the input and output terminals. Amplifier 130 filters or smooths the detector output signal for application to the motor driver 126.

The driver 126 responsive to control signal on connection 140 energizes motor 111 with a nominal drive signal designed to translate the carriage approximately in consonance with stylus tracking. This nominal drive signal is modulated by the output signal from the filter 130 to maintain the stylus, on average, equidistant between the electrodes 119 or some other predetermined relationship. The position sensor and detection circuits, the filter 130, driver 126 and motor 111 are therefore seen to operate in a servo loop to maintain the stylus and carriage in a particular relationship, nominally with the stylus arm and coupler 113 in a relaxed or unbiased condition.

The player includes a stylus deflection apparatus including electromagnetic coils 115 secured to the carriage 110 and permanent magnet 107 secured to the stylus arm. When current is applied to the coils from driver 121 the magnetic field generated between the coils applies a force to magnet 107 and moves the stylus arm in the appropriate direction designated V in the drawing. Typically, disc records of the type under consideration include ancillary digital information relating to track and field number, etc., in the recorded information. See U.S. Pat. No. 4,142,209 entitled "Disc Track Servo System" for an example of inserting ancillary digital information in a recorded video signal. On playback this ancillary information is extracted from the recorded signal by circuitry 127 and applied to microprocessor 128. The microprocessor monitors the recovered ancillary numbers to determine whether the stylus progression is in conformance with the programmed or desired progression and if not, applies the requisite control signal to driver 121. Note that the combination of a servoed arm carriage and a microprocessor controlled stylus deflector permits implementation of special effects. For example, if under program control 129 the microprocessor conditions the buffer 121 to deflect the stylus arm radially inward at a controlled rate faster than the normal tracking progression of the stylus, the stylus position sensing system will condition the motor to drive the carriage in consonance with the higher average forward velocity of the stylus and fast forward scan of the record may be achieved.

Each track on the disc record contains at least one frame of television signal information including blanking intervals in which may be contained sequential frame and track identification numbers.

If a disc record has a surface defect that produces a locked groove, the stylus will be prevented from progressing in a normal playback track sequence. In fact, the stylus may be kicked backward relative to normal playback progression by several track convolutions. When the stylus progression is halted or the stylus is kicked backwards, the track numbers are repeated or decremented. Microprocessor 128 is programmed to recognize such anomalous track number repeats or decrements and energizes the coils 115 to deflect the stylus/stylus arm forward. The first detected track number subsequent to a stylus arm deflection attempt will indicate the success or failure of the locked groove correction. Note that for a system having a deflector driver 121 capable of being programmed for energizing the coils 115 with different prescribed amplitudes of signal, a first deflection locked groove corrective attempt may be performed with a nominal amplitude signal and with each unsuccessful attempt, the coil energization amplitude can be increased until a successful deflection occurs. However, the condition may exist where the stylus deflector alone cannot advance the stylus past the defect which created the locked groove.

If a locked groove is determined to be insurmountable by virtue of failure to advance the stylus after a predetermined number of unsuccessful stylus deflection attempts, a mechanical bias is imposed on the stylus arm 112/coupler 113 combination to aid the deflector apparatus. The mechanical bias is applied by providing an electrical offset to the carriage servo system. In the drawing, consider the normal progression of the stylus to be toward the axis of rotation of the disc, i.e., leftward. By biasing the carriage servo loop to position the stylus as indicated by the right most broken line relative to the carriage, it can be readily appreciated that the restorative force generated in the coupler 113 is directed toward the axis of disc rotation and will tend to aid the force applied by deflector coils 115 in translating the stylus leftward. The amount of bias may be applied incrementally in response to further unsuccessful deflection attempts or the maximum deflection permitted by system constraints may be imposed immediately.

Electrical bias to the servo loop is applied at connection 132 between the filter 130 and detector 125 by decreasing the potential thereat. In the drawing, a first serially connected diode 133 and resistor 135 pair is connected between connection 132 and the microprocessor input/output (I/O) device. Responsive to microprocessor control the diode-resistor serial pair is connected to a reference potential conditioning diode 133 into conduction so that resistor 135 and resistor 137 form a voltage divider to reduce the potential which is applied from the detector 125 output terminal to the input connection 132 of the filter 130. A potential reduction at connection 132 results in a potential increase at the filter output connection 141 which in turn causes the motor 111 to move the carriage forward (leftward) and thereby place a bias on the stylus arm 112. A second diode-resistor pair, 134 and 136 respectively is connected between the microprocessor 128 I/O and connection 132 to provide for further offset if desired. In fact, a number of such diode-resistor pairs may be arranged at connection 132 to permit offsetting of the stylus arm in a plurality of incremental steps.

The last most incremental bias step may create a carriage-stylus arm condition which is impossible to achieve, i.e., the stylus arm cannot swing to a relative carriage position commensurate with the applied electrical bias because of mechanical constraints, so that the carriage, in attempting to attain such condition, physically engages the stylus arm and directly pushes it forward to clear the locked groove. This mode of operation is, however, a method of last resort.

It should be noted that if the loop servo response is slow, a single diode may be conditioned to conduct with a relatively large signal. The resulting potential drop at connection 132 would be gradually integrated on the capacitor 131 creating a gradually increasing offset in the stylus arm-carriage relationship, during which time a number of stylus deflections may be attempted.

An offset potential to produce the stylus arm bias may be applied to alternate points in the servo circuit. For example, a programmable voltage source controlled by the microprocessor 128 may be arranged to establish the reference potential on the filter amplifier 130. A potential increment, $\Delta V_{REF}$, on the non-inverting input terminal produces a result similar to a like potential decrement to the inverting input terminal of the amplifier. A further alternative may include means for offsetting the detector 125 output signal internal to the detector.

The use of a variable or programmable means to offset the servo loop to effect a mechanical bias in the stylus arm assembly facilitates further player versatility in that the deflection system may be adaptively calibrated to (a) produce equal stylus deflections forward and backward for like amplitude energization signals, or (b) to produce a desired stylus deflection for a nominal deflector coil energization signal. With respect to deflection equalization, at the beginning of play, a control sequence may be initiated which energizes the stylus deflection circuitry for equal forward and rearward stylus deflection, -the number of information tracks skipped or translated in each direction being calculated by virtue of the microprocessor monitoring the track identification numbers. Responsive to unequal forward and rearward deflection results, the servo signal is offset to mechanically bias the stylus arm in the appropriate direction to tend to equalize the forward and rearward deflection. This sequence is iterated until the system achieves the desired deflection equalization.

Item (b) above is accomplished in a similar manner. Prior to normal playback a deflector induced stylus translation is produced and the number of tracks skipped is detected. If the number of tracks translated is different from the desired number for the particular deflection energization signal, the servo signal and thereby the stylus arm is offset or biased to appropriately aid or limit the deflector force in conformance with the desired stylus deflection response. This also would be an iterative technique occurring until the desired response is achieved.

What is claimed is:

1. A video disc playback apparatus comprising:
   a base for rotatably supporting a disc record, said record having information tracks thereon;
   a signal pickup transducer for engaging said information track and recovering prerecorded signal therefrom; said pickup transducer secured to the first end of a stylus arm;
   a carriage mechanism wherein a second end of said stylus arm is secured so that a longitudinal axis of the stylus arm is substantially tangential to an information track currently engaged by said pickup transducer, said carriage mechanism translating the secured end of the stylus arm in consonance with the radial travel of the pickup transducer across the disc record;
   an electromechanical transducer cooperating with said stylus arm for selectively deflecting said pickup transducer radially across said information tracks;
   motive means responsive to control signals for translating said carriage mechanism;
   circuitry responsive to the relative carriage-stylus position for generating said control signals to maintain the stylus arm in a substantially mechanically unbiased condition relative to the carriage mechanism; and
   means for selectively conditioning said circuitry to create a mechanical bias between the carriage and stylus arm thereby creating forces in a direction to aid or restrain deflection forces developed by said electromechanical transducer.

2. The video disc playback apparatus set forth in claim 1 wherein the circuitry comprises:
   a position sensitive capacitor having a first plate secured in fixed relation to the stylus arm and a second plate secured in fixed relation to the carriage mechanism;
   a signal source having substantially constant frequency and constant amplitude signal, signals from said source being applied to said second plate, the amplitude of signal coupled to the first capacitor plate being indicative of the stylus-carriage relative position;
   detector means for producing at an output terminal thereof a generally dc control signal potential corresponding to the amplitude of the signal coupled to the first capacitor plate;
   means connected to the detector means output terminal for conditioning said control signal potential; and
   motor driver circuitry connected for energizing said motor; said driver circuitry producing drive signals to energize said motor at a preselected rate and arranged to receive said conditioned control signal to increase and decrease said preselected rate according to the relative stylus-carriage position.

3. The video disc playback apparatus set forth in claim 2 further including:
   control means responsive to programmed player commands and to components of signal recovered from the disc record for controlling said electromechanical transducer and said motor drive circuitry; and
   wherein the means for selectively conditioning the circuitry to create a mechanical bias includes:
   means responsive to said control means for selectively offsetting the detector control signal potential which is applied to the means for conditioning said control signal.

4. A video disc playback apparatus comprising:
   a base for rotatably supporting a disc record, said record having information tracks thereon;
   a signal pickup transducer for engaging said information track and recovering prerecorded signal therefrom; said pickup transducer secured to the first end of a stylus arm;
   a carriage mechanism wherein a second end of said stylus arm is secured so that a longitudinal axis of the stylus arm is substantially tangential to an information track currently engaged by said pickup transducer, said carriage mechanism translating the secured end of the stylus arm in consonance with the radial travel of the pickup transducer across the disc record;
   an electromechanical transducer cooperating with said stylus arm for selectively deflecting said pickup transducer radially across said information tracks;

detector circuitry responsive to relative carriage-stylus position for generating a control signal at an output terminal thereof;

a motor coupled to the carriage mechanism for translating said carriage mechanism and thereby the stylus radially across said disc record;

motor driver circuitry connected for energizing said motor; said driver circuitry producing drive signals to energize said motor at a preselected rate and arranged to receive said control signal to increase and decrease said preselected rate according to the relative stylus-carriage position;

control means responsive to programmed player commands and to components of signal recovered from the disc record for controlling said electromechanical transducer and said motor drive circuitry; and means for selectively offsetting the control signal potential including a diode having a first terminal connected to the detector output terminal and having a second end connected to an output port of said control means, said diode being poled to conduct when said output port exhibits a predetermined output state, wherein said offset control signal will tend to selectively impart a mechanical bias between the stylus arm and the carriage mechanism creating a force in a direction to aid or restrain deflection forces developed by said electromechanical transducer.

5. A video disc playback apparatus comprising:

a base for rotatably supporting a disc record, said record having information tracks thereon;

a signal pickup transducer for engaging said information track and recovering prerecorded signal therefrom; said pickup transducer secured to the first end of a stylus arm;

a carriage mechanism wherein a second end of said stylus arm is secured so that a longitudinal axis of the stylus arm is substantially tangential to an information track currently engaged by said pickup transducer, said carriage mechanism translating the secured end of the stylus arm in consonance with the radial travel of the pickup transducer across the disc record;

an electromechanical transducer cooperating with said stylus arm for selectively deflecting said pickup transducer radially across said information tracks;

a motor coupled to the carriage mechanism for producing said translation;

a detector responsive to relative carriage-stylus position for generating a control signal at an output terminal thereof;

an operational amplifier having an inverting input terminal connected to said detector output terminal, an output terminal with a capacitor connected between said amplifier output terminal and said inverting input terminal and having a non-inverting input terminal a programmable potential source having an output terminal connected to said amplifier non-inverting input terminal for applying potential thereto in predetermined increments, motor drive circuitry connected for energizing said motor; said drive circuitry producing drive signals to energize said motor at a preselected rate and responsive to signal from the output terminal of said amplifier to increase and decrease said preselected rate according to the relative stylus-carriage position, and wherein a mechanical bias is selectively created between the stylus arm and the carriage mechanism responsive to said predetermined potential increments, and thereby creating forces in a direction to aid or restrain deflection forces developed by said electromechanical transducer.

6. A video disc player comprising:

a rotatable base for supporting a disc record having information tracks thereon, said tracks including prerecorded information for identifying individual ones of said tracks;

a signal pickup stylus secured to a first end of a longitudinal pickup arm, said arm arranged substantially tangential to a current information track engaged by said pickup stylus for recovering signal therefrom;

a carriage having the second end of said pickup arm secured thereto, said carriage being translated by a servo motor to maintain said pickup arm substantially tangential to the current information track as the stylus progresses normally across the disc record during playback;

servo sensor circuitry for generating a control signal at a first output terminal, said control signal being related to the relative position of the stylus with respect to the carriage;

means having an input terminal connected to said first output terminal, for averaging said control signal, the averaged control signal being available at a second output terminal;

a motor drive circuit responsive to a further control signal for driving said servo motor at a predetermined rate in a predetermined direction, said predetermined rate being modulated by said averaged control signal to maintain the stylus and carriage in a predetermined average relationship;

control means responsive to an anomalous occurrence of track identification signals for producing first and second correction signals at first and second output terminals thereof respectively;

stylus deflection means responsive to said first correction signal for selectively imparting a radial translation to the stylus;

means connected between the second output terminal of said control means and the input terminal of the means for averaging said control signal, for offsetting the servo signal thereat responsive to said second correction signal, said second correction signal occurring after unsuccessful stylus translation by said stylus deflection means, and wherein offsetting the servo signal produces a carriage translation to mechanically bias the stylus arm to aid the stylus deflection means in further attempts to translate said stylus.

7. The video disc player set forth in claim 6 wherein the means connected between the second output terminal of said control means and the input terminal of the means for averaging said control signal comprises a diode poled to conduct for a preselected value of said second correction signal.

8. The video disc player set forth in claim 6 wherein the control means is a microprocessor.

9. The video disc player set forth in claim 6 wherein the stylus deflection means comprises:

first and second coils secured to the carriage and aligned coaxially;

a permanent magnet secured to the stylus arm, said magnet being disposed between said first and second coils so that when energizing signal is applied to said coils, the magnetic fields created therebetween will impart a force to the permanent magnet tending to move the magnet and thereby the stylus in a direction radially across the disc record.

* * * * *